(12) United States Patent
Bravo et al.

(10) Patent No.: US 7,878,450 B2
(45) Date of Patent: Feb. 1, 2011

(54) FLOAT PACK ASSEMBLY AND METHOD OF USE

(75) Inventors: Pablo Enrique Bravo, Bonita, CA (US); Sunny Cardinal Huff, San Diego, CA (US)

(73) Assignee: Apical Industries, Inc., Oceanside, CA (US)

( * ) Notice: Subject to any disclaimer, the term of this patent is extended or adjusted under 35 U.S.C. 154(b) by 1079 days.

(21) Appl. No.: 11/641,916

(22) Filed: Dec. 18, 2006

(65) Prior Publication Data

US 2010/0230534 A1 Sep. 16, 2010

(51) Int. Cl.
*B64C 25/54* (2006.01)

(52) U.S. Cl. ........................................ 244/107; 441/40

(58) Field of Classification Search ............... 244/17.15, 244/17.17, 100 A, 101, 105, 106, 107, 108; 441/40, 41, 42; 114/345
See application file for complete search history.

(56) References Cited

U.S. PATENT DOCUMENTS

| | | | | |
|---|---|---|---|---|
| 2,940,700 A | * | 6/1960 | Trannoy | 244/107 |
| 2,955,785 A | * | 10/1960 | Smith | 244/100 A |
| 3,056,980 A | * | 10/1962 | Holladay | 441/129 |
| 3,154,270 A | * | 10/1964 | Jensen | 244/101 |
| 3,176,937 A | | 4/1965 | Labrecque et al. | |
| 3,467,343 A | | 9/1969 | Violleau | |
| 3,506,222 A | | 4/1970 | Anderson | |
| 3,507,466 A | | 4/1970 | La Fleur | |
| 4,165,059 A | | 8/1979 | Summer | |
| 4,451,016 A | | 5/1984 | Genovese | |
| 4,655,415 A | | 4/1987 | Miller et al. | |
| 4,676,461 A | | 6/1987 | Musselwhite | |
| 4,697,762 A | * | 10/1987 | Arney | 244/101 |
| 6,644,582 B1 | | 11/2003 | Parrott et al. | |
| 6,709,019 B2 | | 3/2004 | Parrott et al. | |
| 6,709,305 B2 | * | 3/2004 | Parrott et al. | 441/40 |
| 7,115,010 B2 | | 10/2006 | Parrott et al. | |
| 7,309,267 B1 | * | 12/2007 | Henry et al. | 441/40 |

FOREIGN PATENT DOCUMENTS

| | | |
|---|---|---|
| EP | 000001607 A2 | 5/1979 |
| FR | 2312408 A | 1/1977 |
| RU | 2001843 C1 | 10/1993 |
| RU | 2191139 C1 | 10/2002 |

* cited by examiner

*Primary Examiner*—Tien Dinh
*Assistant Examiner*—Michael Kreiner
(74) *Attorney, Agent, or Firm*—Peter K. Hahn; Luce, Forward, Hamilton & Scripps, LLP

(57) ABSTRACT

An emergency floatation system for attachment to a helicopter that includes a support frame, a float pack assembly and an inflation system. The float pack assembly includes a float in a packed configuration, a sleeve integrated into the float and a rigid support that at least partially extends through the sleeve. The float pack assembly is configured so that it may be installed and/or removed from the support frame separate from the inflation system.

19 Claims, 4 Drawing Sheets

FLOAT PACK ASSEMBLY AND METHOD OF USE

FIELD OF THE INVENTION

The present invention is directed to emergency floatation devices, in general, and more particularly to emergency floatation devices that include a float pack assembly that may be replaced without replacing the entire emergency floatation device.

BACKGROUND OF THE INVENTION

The use of floatation devices for buoyantly supporting a helicopter on a body of water has been prevalent for many years. Some helicopters are equipped with fixed utility floats that do not require inflation. Others are equipped with inflatable floatation bags that are disposed deflated upon the landing skids or within compartments on the helicopter. These floatation bags are inflated in order to support the helicopter when ditching or landing in water is anticipated. Typically, the floatation bags are fixedly attached to the helicopter landing skids and packed tightly within flexible fabric covers. However, such systems are inadequate for use on helicopters that utilize landing gear rather than skids. As a result various other floatation systems have been integrated into fuselage compartments and/or compartments coupled to other portions of the aircraft, such as non-retractable landing gear. The floatation bags are only inflated if an emergency landing on water is expected. Conventional helicopter floatation bags suffer from a variety of shortcomings, some of which are discussed below.

For example, U.S. Pat. No. 3,507,466 discloses a helicopter undercarriage including a pair of floatation bags attached to the landing skids. The preferred embodiment discloses the floatation bags disposed underneath the landing skids. A drawback with this configuration is that the floatation bags will likely be ruined if the helicopter lands on a muddy marsh area, e.g. instead of open water. Further, since the floatation bags completely surround the landing skid, they will become worn and possibly damaged during each normal landing. Furthermore, the inflatable envelope structures are integrated onto the landing skids so that their removal would be time consuming and would likely required a heavily-trained technician.

Another example is U.S. Pat. No. 4,655,415, which discloses a helicopter floatation pack disposed on top of the landing skids. A drawback with this configuration is that the floatation pack must be attached to a landing skid so that it is above the skid. As a result, the installed floatation pack may limit access to the fuselage. In addition, because the structural member provides the support for a float pack cover, inflation fittings and the floatation bags, removal of the structural member from the landing skid requires removal of the entire flotation pack from the aircraft. As a result, additional handling is required during maintenance and packing to manipulate all of those components.

Another example is RU 2191129, which discloses a helicopter that includes inflatable floats. The system includes a two pairs of front and rear floats. The front floats are secured in the nose portion of the fuselage and the rear floats are mounted adjacent rear landing gear. A compressed gas system is used to inflate the floats when required, which includes high-pressure bottles housed in containers that are suspended from the underside of the fuselage. Pressure lines extend from the gas bottle containers to the floats. A disadvantage of the system is that the float housings appear to require that the floats be folded during the process of inserting them into the containers.

In view of these shortcomings, there exists a need for a helicopter floatation system that employs a float pack assembly that may be easily installed and/or removed from the remainder of the floatation system.

Any publications that are discussed above should not be taken as an admission that the publications are prior art.

SUMMARY OF THE INVENTION

It is an object of the present invention to provide an emergency floatation system that includes a float pack assembly that may be easily installed and/or removed from the remainder of the system by providing a float pack assembly that includes at least one float that is supported by a rigid support.

One aspect of the present invention involves an emergency floatation system including a support frame, an inflation system and a float pack assembly that may be easily removed from the support frame separate from the inflation system. The float pack includes an inflatable float in a packed configuration, a sleeve integrated into the inflatable float; and a rigid support that extends through the sleeve. The rigid support supports the float in a packed configuration and is configured to be releasably mounted to the support frame.

In a further aspect of the present invention, a float pack assembly includes an inflatable float in a packed configuration, a sleeve integrated into the inflatable float, a rigid support that is configured to extend through the sleeve and a plurality of retainers that are configured to retain the inflatable float against the support.

DETAILED DESCRIPTION

Figure 1:
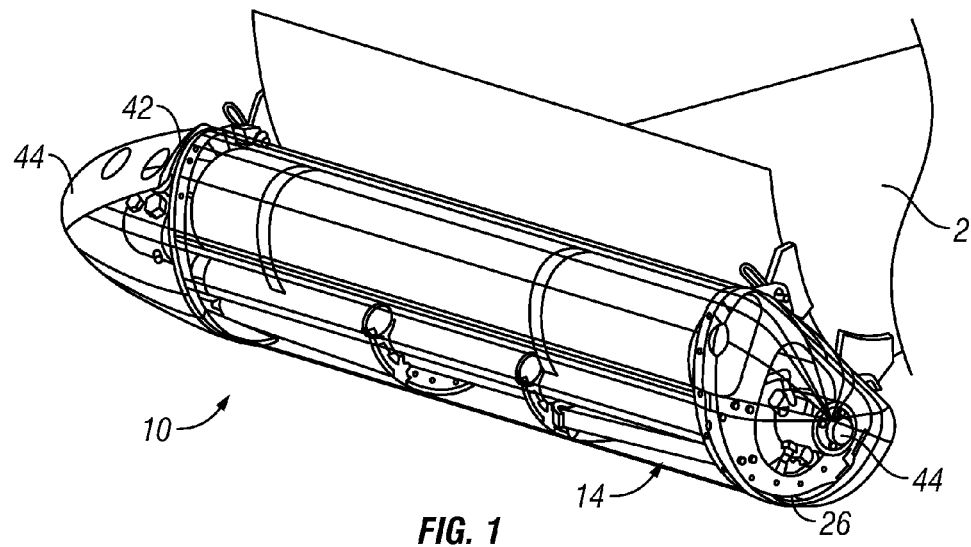
FIG. 1 is a perspective view of a float pack assembly installed in a floatation system according to the present invention.
Figure 2:
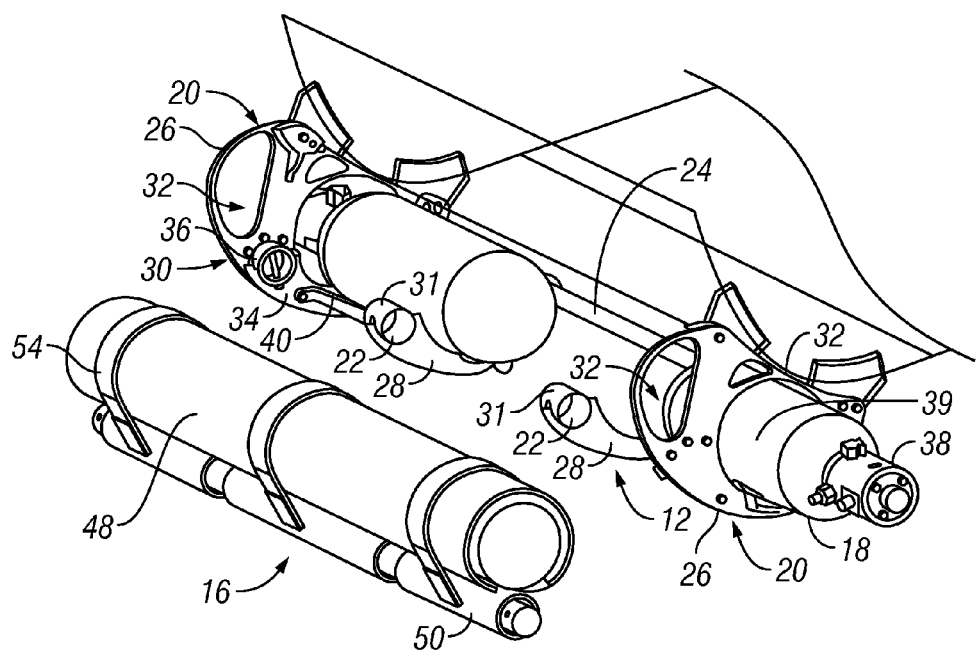
FIG. 2 is a perspective view of the float pack assembly separated from the remainder of the floatation system of FIG. 1.

Referring to FIGS. 1 and 2, an emergency floatation system 10 according to an aspect of the present invention is generally coupled to a lower portion of an aircraft fuselage 2. As shown, the system is configured to form a pod that is coupled to an outer surface of the aircraft fuselage. However it should be appreciated that the system may alternatively be mounted within a cavity provided in the aircraft fuselage that includes mounting features for mounting the float pack assembly of the present invention, or it may be integrated into a portion of a landing skid.

Floatation system 10 generally includes a support frame 12, a housing 14, a float pack assembly 16 and a pressurized fluid source (e.g., pressurized canisters 18). Floatation system 10 is configured so that support frame 12, pressurized canisters 18, and the hoses and wiring included in floatation system 10 may all be left undisturbed during installation and/or removal of the inflatable floats. This is achieved by providing the inflatable floats combined in the float pack assembly 16, which allows the floats to be retained in the packed configuration when the floats are separated from the aircraft and the other components of system 10. As a result, the floats may be easily installed as a single packed unit into floatation system 10. The configuration of float pack assembly 16 allows the floats to be easily installed during initial construction or if replacement or inspection is desired. Furthermore, the design of float pack assembly 16 simplifies the installation process so that it does not require extensive training. It also allows for float exchange without requiring the installer to transform the floats into the packed configuration after installation.

Support frame 12 creates the mounting structure for the components of system 10. In the present embodiment, support frame 12 includes a pair of end plates 20, a pair of intermediate support arms 22 and a support frame rod 24. End plates 20 are coupled to fuselage 2 so that they extend radially outward from fuselage 2 and are generally parallel and spaced from each other. End plates 20 are spaced by a selected distance so that the ends of float pack assembly 16 are supported by end plates 20.

Each end plate 20 is sized so that an outer surface 26 supports housing 14 such that housing 14 encloses the components of system 10 when it is closed. As shown in FIG. 1, outer surface 26 is configured to support housing 14 so that it encloses system 10 with float pack assembly 16 located adjacent an inner surface of housing 14.

Each end plate 20 also includes a float pack assembly mounting feature 30. In the present embodiment, float pack assembly mounting feature 30 is a collar 34 that extends from a surface of end plate 20 that faces the other end plate 20. Collar 34 is generally an annular wall that extends from end plate 20 a sufficient distance so that a fastener may be used to couple a portion of float pack assembly 16 to end plate 20. For example, collar 34 has a length sufficient to include an aperture 36 that is configured to receive a pin that releasably couples an end of float pack assembly 16 within collar 34. It should be appreciated that each end plate 20 includes a mounting feature 30 so that the ends of float pack assembly 16 are coupled to a respective end plate 20. It should further be appreciated that the float pack assembly mounting features may be placed on any portion of support frame 12.

End plates 20 also include optional canister support apertures 32. Apertures 32 are configured so that end plates 20 support canisters 18 that extend partially through apertures 32. Canisters 18 are preferably oriented so that a valve portion 38 of each canister 18 extends away from the center portion of system 10 beyond end plate 20. That configuration allows valve portion 38 to be easily accessed, even when float pack assembly 16 is installed. However, it should be appreciated that canisters 18 may be oriented in any way desired. For example, canisters 18 and end plates 20 may be configured so that no portion of a canister 18 extends through end plate 20, or so that a portion of canister 18 extends through an aperture in end plate 20 without canister 18 being supported by end plate 20. Furthermore, the size of each canister 18 is selected to correspond to the inflatable floats that are reliant on the respective canister 18 for inflation. For example, a canister that is devoted to the inflation of a life raft may be smaller than a canister that is devoted to the inflation of one or more aircraft floats.

Support arms 22 are mounted on support rod 24, which extends between end plates 20. Support arms 22 are generally arcuate members that include an outer surface 28 that has a curvature that is generally parallel and aligned with outer surface 26 of end plates 20. Each of support arms 22 extends laterally outward from support rod 24 at a location that is spaced from an end plate 20. In the present embodiment, a pair of support arms 22 are included and the space between each support arm 22 and the nearest end plate 20 is less than the length of a body portion 39 of a respective pressurized canister 18.

Support arms 22 also include float pack assembly mounting features 31 at the outer ends of support arms 22. Mounting features 31 are configured to support a portion of float pack assembly 16 when it is installed in floatation system 10 between end plates 20. Mounting features 31 may be cradles or collars that are configured to receive portions of float pack assembly 16. Preferably, mounting features 31 are configured so that float pack assembly 16 may be releasably coupled to each of mounting features 31 by a fastener, such as a removable pin. It should be appreciated that support frame 12 may include any support devices known in the art and need not include end plates 20. For example, end plates 20 may be replaced by one or more support struts or rings or additional support arms.

An optional canister support plate 40 is suspended between end plate 20 and support arm 22 and provides a location for mounting canister 18. In the present embodiment, the distance between support arm 22 and end plate 20 is less than the length of body portion 39 of the canister that is supported by the canister support plate 40 that extends therebetween. As a result the amount of material required to support each canister 18 may be minimized. It should be appreciated however that the space between support arm 22 and end plate 20 may be greater than the length of body portion 39 of the respective canister if desired. Support plate 40 is a generally arcuate plate that is oriented so that it cradles a respective canister 18. In addition, straps or other mounting devices may be employed to attach canisters to support plates 40.

It should be appreciated that each inflatable body (e.g., float, life raft, etc.) may be inflated by pressurized fluid from a designated canister 18 or multiple inflatable bodies may be inflated by fluid from one canister 18. For example, float pack assembly 16 may include one aircraft float 48 and one life raft 49 and a separate canister 18 may be included to inflate each of those inflatable bodies (i.e., the aircraft float and the life raft). It should be appreciated that any number of aircraft floats 48 and/or life rafts 49 may be included in system 10 and any number of canisters 18 may be included.

Figure 3A:
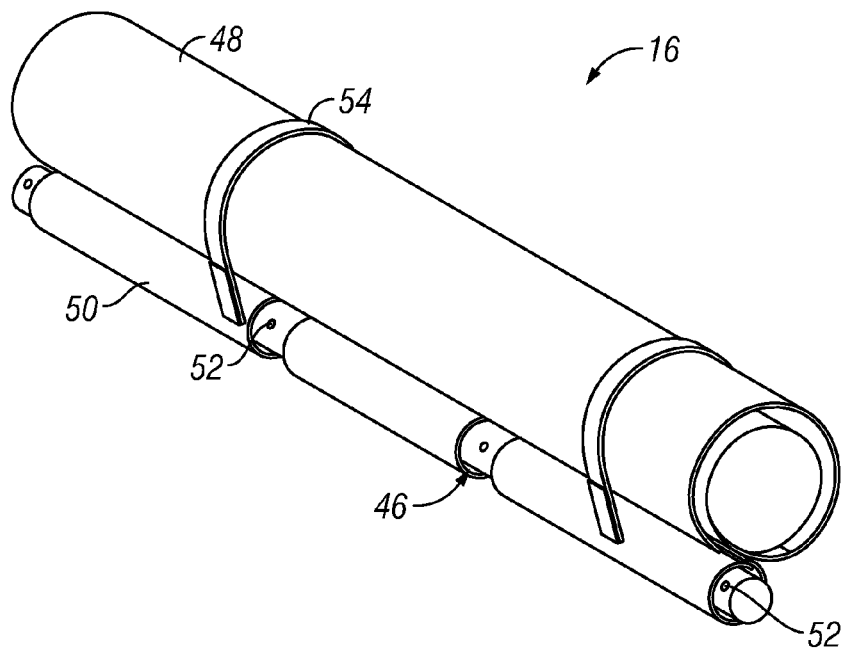
FIG. 3A is a perspective view of a float pack assembly according to the present invention.
Figure 3B:
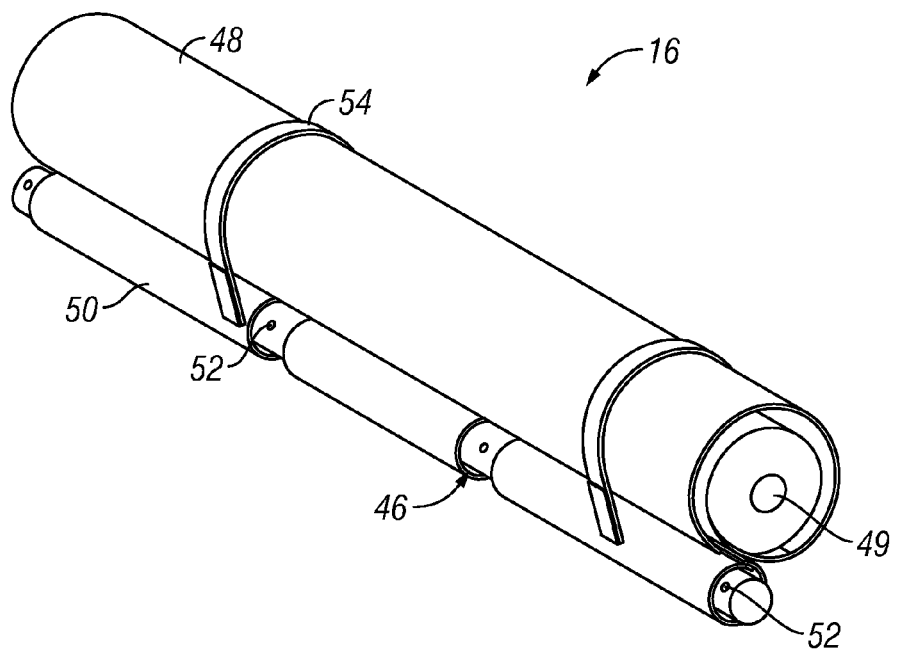
FIG. 3B is a perspective view of a float pack assembly according to the present invention.

As mentioned above, float pack assembly 16 is configured so that it may be easily installed on support frame 12 as a unit with the inflatable bodies retained in the packed configuration. Referring to FIGS. 2 and 3A-3B, float pack assembly 16 includes a float pack frame 46, inflatable aircraft float 48, an inflatable life raft 49 and a plurality of retainers 54. In the present embodiment, aircraft float 48 and the life raft 49 are rolled to place them in the packed configuration. The life raft 49 is rolled and located inside of the rolled aircraft float 48. In an embodiment, the life raft 49 is configured so that it becomes accessible after aircraft float 48 has completely unrolled. In another embodiment, the life raft 49 is configured so that it unrolls with aircraft float 48. Float pack frame 46 provides a structure for attaching the inflatable bodies in the packed configuration when float pack assembly 16 is separate from support frame 12. As a result, aircraft float 48 and the life raft 49 may be installed into or removed from the floatation system 10 while the floats are retained in the packed configuration.

In the present embodiment, frame 46 is a tube that extends through a plurality of girts 50, or sleeves, that are coupled to float 48. As shown, girts 50 are loops of material, which may be the same material as that of float 48, that are integrated into float 48. Alternatively, girts 50 may be separate components and/or materials that are integrated into float 48 by a coupling process such as adhering or welding girts 50 to float 48. Girts 50 are attached to float 48 with sufficient strength to maintain attachment between float 48 and an aircraft when float 48 is inflated and providing buoyancy to the aircraft. A plurality of apertures 52 extend through frame 46 and are adapted to receive removable fasteners for releasably coupling frame 46 to support frame 12 when float pack assembly 16 is mounted in floatation system 10.

A plurality of retainers 54 retain float 48 in the packed configuration and couple float 48 to frame 46. Retainers 54 are straps that are wrapped around float 48 and frame 46. Upon inflation of float 48, during use of floatation system 10, retainers 54 release so that float 48 is free to transform from the rolled configuration into an inflated, deployed configuration. Retainers 54 are configured so that the inflation of float 48 causes them to release. Retainers 54 may be any device that is capable of retaining float 48 on frame 46 and releasing during the inflation of float 48. For example, retainers 54 may be strips of the float material that are coupled to float 48 and are sufficiently long to wrap around frame 46 and attach to one another. The strips may have hook and loop fasteners so that the ends of the strips are releasably attached. Alternatively, snaps or other low strength connectors may be used to couple retainers 54. As a further alternative, retainers 54 may be designed so that they tear off of float pack assembly 16 during inflation of float 48. It should further be appreciated that any material may be used for retainers 54, such as nylon webbing, plastic straps, woven material, etc.

Float pack assembly 16 is configured so that it may be assembled separate from an aircraft and the other components of floatation system 10. In particular, the assembly of float pack assembly 16 includes steps that may be performed at any location. In one method of assembly, float 48 is rolled into the rolled, packed configuration. Preferably, a life raft is packed and integrated into float 48 when it is rolled so that upon inflation of float 48, the life raft becomes accessible to the user and may be inflated separately, if desired. When float 48 is rolled, girts 50 are exposed so that the next step of extending frame 46 through girts 50 may be performed. In addition, in the rolled, packed configuration, inflation connectors are exposed so that float 48 and any life raft may be coupled to the pressurized fluid containers of system 10 after float pack assembly 16 is installed in the system. After frame 46 is inserted through girts 50, retainers 54 are wrapped around frame 46 and float 48 and attached so that retainers 54 hold float 48 against frame 46. As shown, one retainer 54 may be included for each girt 50, but it should be appreciated that an number of retainers 54 may be utilized.

Figure 4:
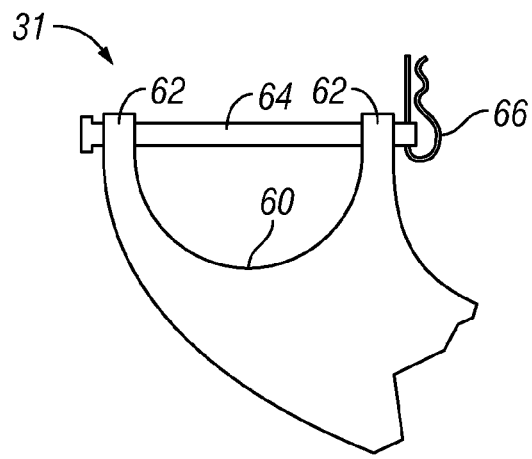
FIG. 4 is a side view of a float pack assembly mounting feature.
Figure 5:
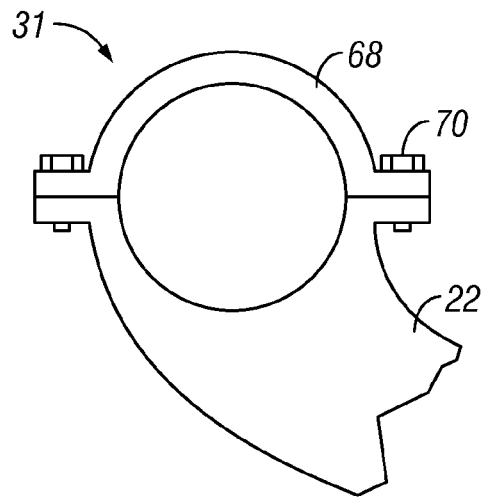
FIG. 5 is a side view of another float pack assembly mounting feature.

After assembly of float 48, frame 46 and retainers 54, float pack assembly 16 may be installed on support frame 12. Although mounting features 30, 31 may be cradles or collars, it should be appreciated that they are configured so that float pack assembly 16 may be easily installed. Mounting features 30, 31 may have many configurations as will be appreciated by a person having ordinary skill. For example, as shown in FIG. 4, the mounting features may be cradles that are formed by a generally U-shaped arcuate surface 60. Side walls 62 of the mounting feature extend upward and include apertures for receiving a removable pin 64. As shown, pin 64 may be retained across the mounting feature by a clip 66 that prevents pin 64 from slipping out of the apertures.

Where mounting feature 30, 31 is a collar, it may be configured to be hinged or so that a portion is removable, as shown in FIG. 5, so that it may be easily opened for insertion of frame 46. As shown in FIG. 5, the mounting feature may include a removable portion 68 that is held to a complimentary portion of support arm 22 by fasteners 70. For example, in the present embodiment, which includes a solid tubular frame and a plurality of girts 50, frame 46 is inserted through girts 50 of float 48 prior to attaching float pack assembly 16 to mounting features 30, 31. As a result, at least some of mounting features 30, 31 must be opened, such as cradles, or openable, such as hinged collars so that frame 46 may be received by mounting features 30, 31 and mounted thereto. In particular, in the embodiment shown, one of mounting features 30 of end plates 20 may be a solid collar while the mounting feature 30 of the other end plate 20 is a cradle. In addition, mounting features 31 are cradles so that an end of frame 46 can be inserted into the collar of end plate 20 and then the remainder received by the cradles.

After float pack assembly 16 is installed, housing 14 is closed. Housing 14 covers the components of emergency floatation system 10 to provide protection from damage. Housing 14 may also reduce the aerodynamic resistance of system 10 when it is attached to an outer surface of the aircraft as an external pod. Housing 14 generally includes an access door 42 and end caps 44. Access door 42 is coupled to support frame 12 so that it is hinged to allow it to open prior to or during deployment of the floats. Access door 42 is preferably releasably coupled at the end opposite the hinge connection so that access door 42 remains closed when deployment of the floats is not desired (i.e., during normal operation of the aircraft). If deployment of the floats is desired, the access door 42 is configured so that the releasable coupling releases and allows access door 42 to rotate about the hinged location to an opened position. The releasable coupling may be any releasable fastener known in the art. For example, the releasable coupling may be hook and loop fasteners, snaps or laces. In addition, the releasable coupling may be an actuator that is controlled by an electronic controller or by release of pressurized gas from canisters 18. For example, the actuator may be configured so that it opens in response to the release of pressurized gas from canisters 18 and operates as a valve so that once it is opened, it allows pressurized gas to inflate the floats.

Figure 7:
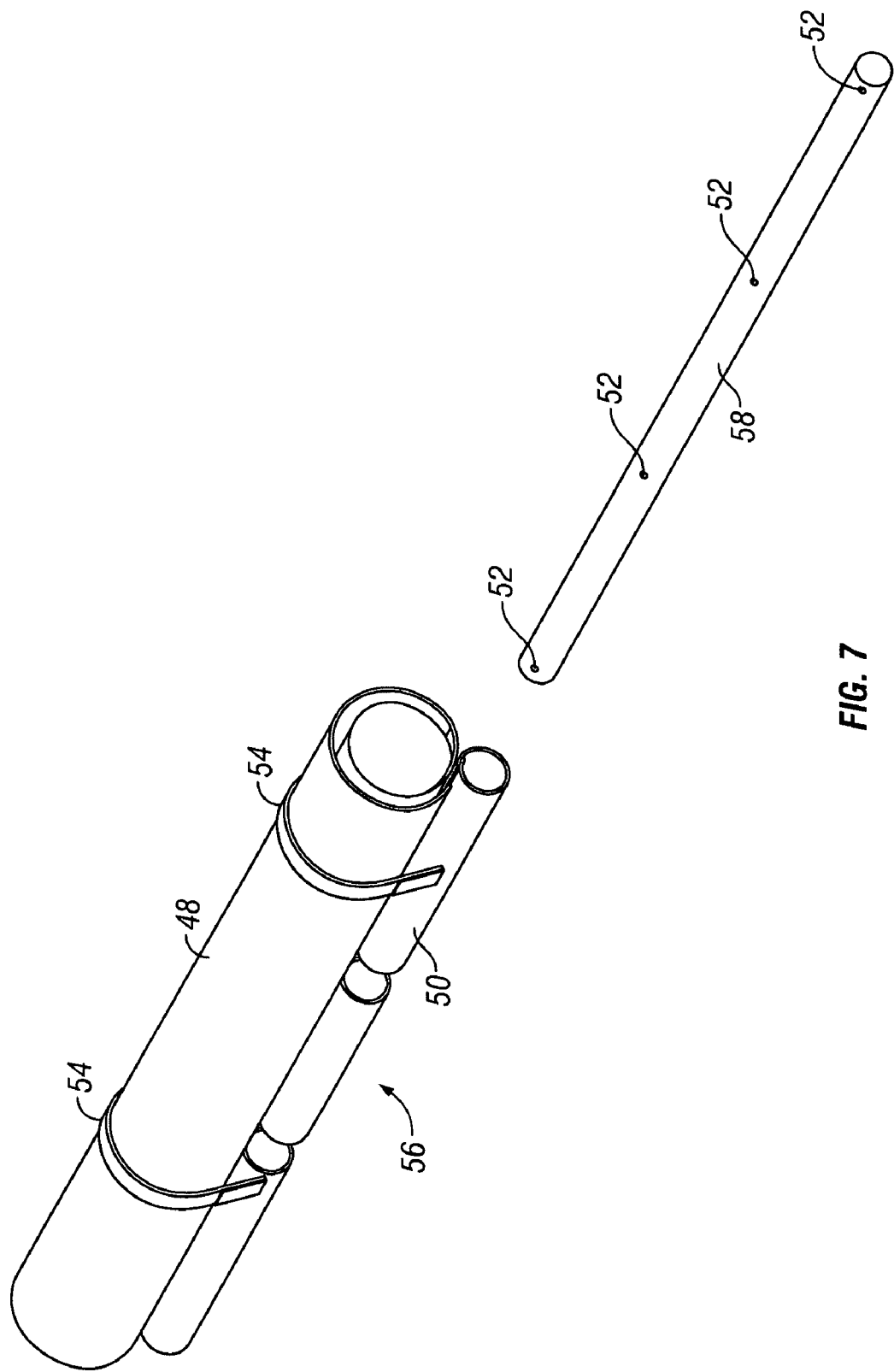
FIG. 7 is a perspective view of another embodiment of the float pack assembly according to the present invention.

In an alternative embodiment of the float pack assembly, shown in FIG. 7, frame 46 includes a float support portion 56 and a mounting portion 58. Support portion 56 is a generally rigid or semi-rigid member that includes a plurality of connected and aligned tubular sections 60. Support portion 56 is coupled to float 48 in the same fashion as frame 46. In particular, float 48 is coupled to support portion 56 so that it remains attached when float 48 is inflated. In addition, support portion 56 is preferably configured so that tubular sections 60 remain tubular when retainers 54 are attached.

Figure 6:
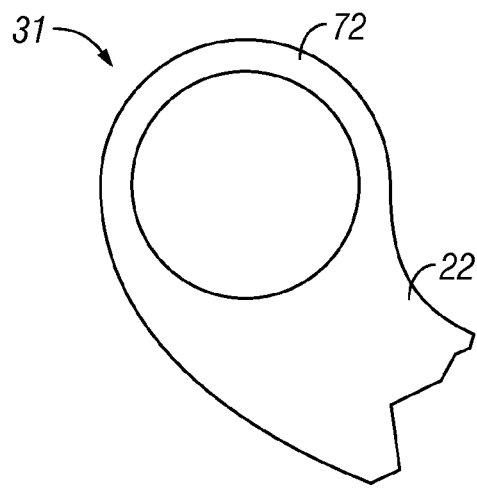
FIG. 6 is a side view of another float pack assembly mounting feature

In order to install float pack assembly 16 with the two-part frame 46, the float 48 in combination with support portion 56 is located on mounting features 30, 31, which may all be solid collars, such as collar 72 of support arm 22 shown in FIG. 6, and mounting portion 58 is extended through mounting features 30, 31. In such a configuration, an installation aperture may be included through an end plate 20 and the corresponding mounting feature 30 so that mounting portion 58 may be slid into position through the installation aperture. It should be appreciated that only one installation aperture through one end plate 20 would be required in such a configuration. After mounting portion 58 is located in the desired position, it may be held in place by inserting removable fasteners, such as pins.

Float 48 may be inflated by triggering valve portion 48 of canisters 18. An actuator, such as an electronic or manual valve switch may be used. Furthermore, a separate actuator for each inflatable body included on the aircraft to selectively inflate them, or a plurality of floats 48 may be activated by a single actuator.

After an emergency water landing, a life raft may be needed so that the crew and any passengers may escape from the aircraft. Inflation of the life raft is also achieved using an actuator such as an electronic or manual valve switch to release the pressurized fluid from a respective canister 18. Preferably, system 10 is configured so that life raft is attached to float 48 by fasteners that release the life raft when it is inflated. Any fluid may be used to inflate the inflatable bodies of system 10 that is capable of providing sufficient buoyancy. For example, suitable gases include, but are not limited to nitrogen, helium, air, carbon dioxide, etc. When system 10 is fully deployed, both float 48 and the life raft are inflated.

The life raft also preferably includes a quick connector having an automatic release mechanism for rapid detachment of the air hose from the respective canister 18. The life raft may further include a pressure relief valve so that gas may be released if the life raft is overfilled. As a further option, the life raft may include a topping valve for inflation of the life raft using a hand pump.

As described above, inflation of floats 48 is achieved using of an actuator, such as an electronic or mechanical valve switch, to release pressurized fluid contained in canister 18 of into an air hose. Each inflatable body also preferably includes an inlet check valve coupled to a respective air hose so that the release of pressurized fluid into the air hose flows into the respective inflatable body through the check valve. The pressure of the pressurized fluid must be sufficient to disengage the retainers 54 and pop open housing 14 when float 48 is inflated.

Many variations of the above-described invention are possible. Such variations are not to be regarded as a departure from the spirit and scope of the invention, but rather as subject matter intended to be encompassed within the scope of the following claims, to the fullest extent allowed by applicable law.

What is claimed is:

1. A floatation system, comprising:
    a float pack assembly including:
        an inflatable float in a packed configuration;
        a sleeve integrated into the inflatable float; and
        a rigid support;
        wherein at least a portion of the rigid support extends through the sleeve such that the rigid support is configured to support the inflatable float;
    a support frame configured to support the float pack assembly, the support frame including:
        two or more end plates supporting the float pack assembly; and
        one or more mounts extending from the two or more end plates;
    the float pack assembly being mounted to the support frame by inserting the rigid support in the one or more mounts.

2. The floatation system of claim 1, further comprising a plurality of releasable retainers that extend around the float and the rigid support and retain the inflatable float on the rigid support such that the float is maintained in a predetermined orientation when in the packed configuration.

3. The floatation system of claim 1, further comprising an inflatable life raft in a packed configuration that is coupled to the inflatable float.

4. The floatation system of claim 1, further comprising an inflatable life raft in a packed configuration that is coupled to the sleeve.

5. The floatation system of claim 1, wherein the rigid support is a rigid tube.

6. The floatation system of claim 1, wherein the inflatable float is rolled in the packed configuration and is supported by the rigid support such that it is parallel to and adjacent the rigid support.

7. The floatation system of claim 1, wherein the sleeve is rigid.

8. The floatation system of claim 1, wherein the one or more mounts include one or more collars.

9. The floatation system of claim 1, further comprising a pressurized canister supported by the two or more end plates.

10. An emergency floatation system for an aircraft, comprising:
    a support frame configured to be fixedly coupled to the aircraft fuselage;
    a float pack assembly coupled to the support frame, including an inflatable float, a sleeve integrated into the float, a rigid support extending through the sleeve, and a plurality of retainers that hold the float on the rigid support, wherein the float is retained on the rigid support in a packed configuration; and
    an inflation system coupled to the support frame,
    wherein the float pack assembly is coupled to the support frame with a plurality of removable pins such that the float pack assembly is configured to be removed from the support frame separate from the inflation system.

11. The emergency floatation system of claim 10, wherein the inflation system includes a source of inflation gas and a fluid coupling that provides fluid communication between the float and the source of inflation gas.

12. The emergency floatation system of claim 10, wherein the plurality of removable pins is six or fewer pins.

13. The emergency floatation system of claim 10, wherein the float pack assembly includes a plurality of releasable retainers that extend around the float and the rigid support and retain the inflatable float on the rigid support such that the float is maintained in a predetermined orientation when in the packed configuration.

14. The emergency floatation system of claim 10, further comprising an inflatable life raft in a packed configuration that is coupled to the inflatable float.

15. The emergency floatation system of claim 10, further comprising an inflatable life raft in a packed configuration that is coupled to the sleeve.

16. The emergency floatation system of claim 10, wherein the rigid support is a rigid tube.

17. The emergency floatation system of claim 10, wherein the inflatable float is rolled in the packed configuration and is supported by the rigid support such that it is parallel to and adjacent the rigid support.

18. The emergency floatation system of claim 10, wherein the sleeve is rigid.

19. An emergency floatation system for an aircraft, comprising:
    a support frame configured to be fixedly coupled to the aircraft fuselage, the support frame including two or more end plates, one or more mounts extending from the two or more end plates;

a float pack assembly including an inflatable float, a rigid sleeve integrated into the float, and a rigid support extending through the rigid sleeve, wherein the float is retained on the rigid support in a packed configuration, the float pack assembly being mounted to the support frame by inserting the rigid support in the one or more mounts; and an inflation system coupled to the support frame, wherein the rigid support of the float pack assembly is coupled to the support frame with a plurality of removable fasteners such that the float pack assembly is configured to be removed from the support frame separate from the inflation system.

* * * * *